Patented July 19, 1949

2,476,581

UNITED STATES PATENT OFFICE 2,476,581

BEVERAGE COMPOSITION

Clarence H. Bloss, Chicago, Ill., assignor, by mesne assignments, to C. H. Bloss Corporation, Chicago, Ill., a corporation of Illinois No Drawing. Application March 13, 1946, Serial No. 654,215

8 Claims. (Cl. 99—28)

This invention relates to the production of beverage compositions and beverages which are of pleasant taste and have nutritive and other desirable qualities and characteristics.

The beverage compositions of the present invention comprise a mixture of a plurality of ingredients, hereafter described, preferably in pulverulent form, which, in combination, serve to produce the novel and highly satisfactory results which are brought about by the present invention. In use, the beverage proper is prepared by making an infusion or decoction with boiling water, in the general manner in which tea or coffee is prepared.

The ingredients contained in the beverage compositions of the present invention are Irish moss, Iceland moss, marsh mallow leaves, yarrow, Althaea root, couch grass, European centaury, horehound, and licorice root. While either the Irish moss or the Iceland moss may be omitted, particularly the former, for best results both should be employed and they should be present in a greater proportion, by weight, than any other ingredient of the beverage composition. Thus, for example, they may be present in proportions ranging from about 32% to about 48%, by weight, of the beverage compositions. Of the remaining ingredients, any one or two of them, preferably any one or two of the couch grass, European centaury or Althaea root, may be omitted with reasonably fair results still being obtained but in no event should any three of them be omitted. However, if the maximum advantage or best results are to be obtained, a combination of all of the aforesaid ingredients should be utilized.

While the proportions of the aforesaid ingredients are open to certain variations and, indeed, certain of them may be omitted as above stated, it has been found that excellent results are obtained if the ingredients are utilized within the ranges of proportions set out below:

| | Percent |
|---|---|
| Irish moss | 13.79 to 20 |
| Iceland moss | 28.52 to 18 |
| Marsh mallow leaves | 7.14 to 15 |
| Yarrow | 8.6 to 12 |
| Althaea root | 10.89 to 5 |
| Couch grass | 7.5 to 2 |
| European centaury | 6.06 to 2 |
| Horehound | 11.76 to 15.01 |
| Licorice root | 5.69 to 10.49 |

As previously indicated, the beverage composition is preferably prepared in the form of a pulverulent composition. To this end, the ingredients may be separately, or in admixture of any two or more thereof, ground to the desired degree of fineness, which may, for example, range from about 60 to about 80 mesh or somewhat finer or coarser. The combination of the ingredients in the selected proportions is then suitably packaged for distribution and sale. The package should preferably be air-tight and may be of oiled paper, waxed paper, moisture-proof Cellophane, or any other known packaging material.

In use, the beverage proper is prepared by boiling the beverage composition in water, preferably for several minutes, five to seven minutes being a satisfactory period. One teaspoonful of the pulverulent beverage composition may be employed for each standard size cup of water, but it will be understood that this proportion may be varied considerably to obtain weaker or stronger decoctions or infusions as the case may be. After boiling for the requisite period of time, the liquid is strained or filtered and is then drunk in the same manner as any tea, preferably as hot as possible.

While the invention has been described in detail, the scope thereof is not to be limited except as set forth in the claims.

What is claimed as new and desired to be protected by Letters Patent of the United States is:

1. A composition, in pulverulent form, for the preparation of beverages, containing at least one member selected from the group consisting of Irish moss and Iceland moss; and the following ingredients: marsh mallow leaves, yarrow, horehound, and licorice root, and at least one member selected from the group consisting of Althaea root, couch grass and European centaury.

2. A composition, in pulverulent form, for the preparation of beverages, containing Irish moss, Iceland moss, marsh mallow leaves, yarrow, horehound, and licorice root, and at least one member selected from the group consisting of Althaea root, couch grass and European centaury, the Irish moss and the Iceland moss comprising from about 32% to about 48%, by weight, of said composition.

3. A composition, for the preparation of beverages, containing the following ingredients in substantially the stated percentages by weight:

| | Per cent |
|---|---|
| Irish moss | 13.79 to 20 |
| Iceland moss | 28.52 to 18 |
| Marsh mallow leaves | 7.14 to 15 |
| Yarrow | 8.6 to 12 |
| Althaea root | 10.89 to 5 |
| Couch grass | 7.5 to 2 |
| European centaury | 6.06 to 2 |
| Horehound | 11.76 to 15.01 |
| Licorice root | 5.69 to 10.49 |

4. A beverage comprising an aqueous decoction or infusion of the composition defined in claim 1.

5. A beverage comprising an aqueous decoction or infusion of the composition defined in claim 2.

6. A beverage comprising an aqueous decoction or infusion of the composition defined in claim 3.

7. In a method of making beverages, the steps which comprise admixing a pulverulent composition with water, boiling for at least several minutes and then straining to remove undissolved matter, said pulverulent composition containing at least one member selected from the group consisting of Irish moss and Iceland moss; and the following ingredients: marsh mallow leaves, yarrow, horehound, and licorice root, and at least one member selected from the group consisting of Althaea root, couch grass and European centaury.

8. In a method of making beverages, the steps which comprise admixing a pulverulent composition with water, boiling for at least several minutes and then straining to remove undissolved matter, said pulverulent composition containing the following ingredients in substantially the stated percentages by weight:

|  | Per cent |
|---|---|
| Irish moss | 13.79 to 20 |
| Iceland moss | 28.52 to 18 |
| Marsh mallow leaves | 7.14 to 15 |
| Yarrow | 8.6 to 12 |
| Althaea root | 10.89 to 5 |
| Couch grass | 7.5 to 2 |
| European centaury | 6.06 to 2 |
| Horehound | 11.76 to 15.01 |
| Licorice root | 5.69 to 10.49 |

CLARENCE H. BLOSS.

REFERENCES CITED

The following references are of record in the file of this patent:

"United States Dispensatory," twentieth edition, published by J. B. Lippincott Company, Philadelphia. Copyright 1918. Pages 329, 1313, 120, 121, 1226, 1166, 1167, 1311, 1312, 1485, 492, 1831.